(12) United States Patent
Ogura et al.

(10) Patent No.: US 6,664,524 B2
(45) Date of Patent: Dec. 16, 2003

(54) FOCUSING METHOD

(75) Inventors: Yukio Ogura, Tokyo (JP); Hideyuki Moribe, Tokyo (JP); Yukio Morishige, Tokyo (JP)

(73) Assignee: NEC Corporation, Tokyo (JP)

( * ) Notice: Subject to any disclaimer, the term of this patent is extended or adjusted under 35 U.S.C. 154(b) by 312 days.

(21) Appl. No.: 09/789,647

(22) Filed: Feb. 21, 2001

(65) Prior Publication Data

US 2001/0019100 A1 Sep. 6, 2001

(30) Foreign Application Priority Data

Mar. 2, 2000 (JP) ........................................ 2000-057073

(51) Int. Cl.[7] ............................................... G02B 7/28
(52) U.S. Cl. ................................ 250/201.2; 250/201.3
(58) Field of Search ........................ 250/201.2, 201.3, 250/201.4, 201.5, 201.8, 204; 356/609, 624; 359/319, 383, 698

(56) References Cited

U.S. PATENT DOCUMENTS

| | | | | |
|---|---|---|---|---|
| 5,365,051 A | * | 11/1994 | Suzuki et al. | 250/201.2 |
| 5,483,056 A | * | 1/1996 | Imai | 250/201.4 |
| 5,483,079 A | * | 1/1996 | Yonezawa | 250/559.29 |

FOREIGN PATENT DOCUMENTS

| JP | 4-3335 | 1/1992 |
|---|---|---|
| JP | 5-312510 | 11/1993 |
| JP | 8-250406 | 9/1996 |
| JP | 11-306554 | 11/1999 |

\* cited by examiner

*Primary Examiner*—David V. Bruce
*Assistant Examiner*—Hoon Song
(74) *Attorney, Agent, or Firm*—Dickstein, Shapiro, Morin & Oshinsky, LLP.

(57) ABSTRACT

The present focusing method is used in a focus detecting apparatus comprising an objective lens, means for entering a luminous flux for focus detection into a target object from a position inconsistent with an optical axis of the objective lens through at least the objective lens, a condenser lens for converging the luminous flux after it is reflected by the target object and again passes through the objective lens, two two-division sensors disposed with the same optical inclination in front of and behind a position where the reflected luminous flux is converged by the condenser lens when a focus of the objective lens is adjusted to the surface of the target object, and a signal processing circuit for performing operational processing of signals from the two two-division sensors. The focus detecting apparatus detects whether the focus of the objective lens is adjusted to the surface of the target object. When focusing is performed with this apparatus, the target object is moved while the focus position is followed after the detection of the focus position, focus detection is performed many times and the detected signal values are averaged, and the resultant average value is used to drive the objective lens. This series of operations is repeated, and then the focus position is fixed.

11 Claims, 6 Drawing Sheets

Fig. 2 (Piror Art)
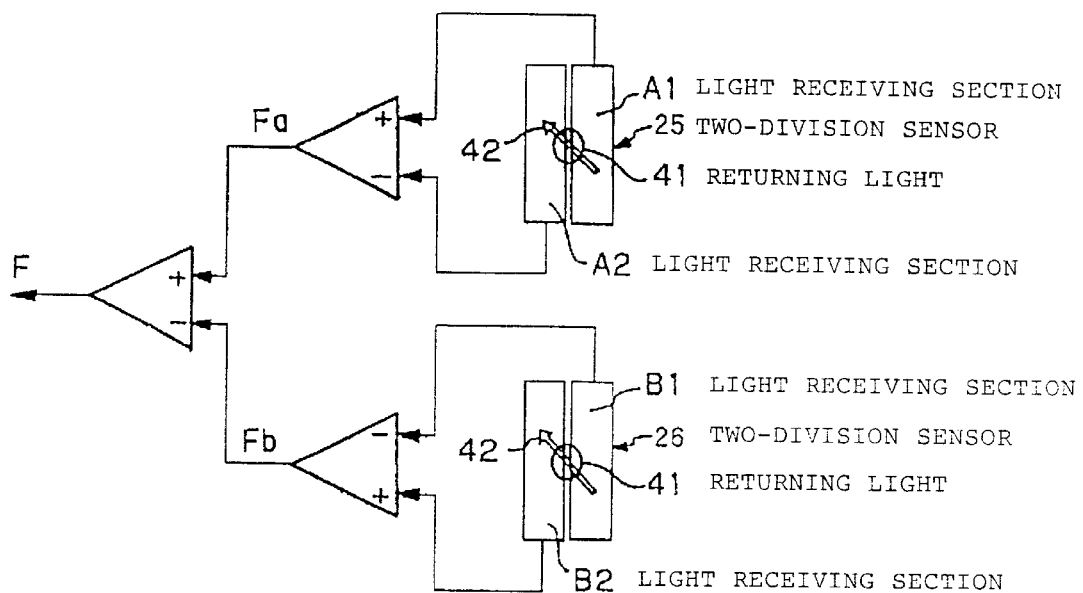

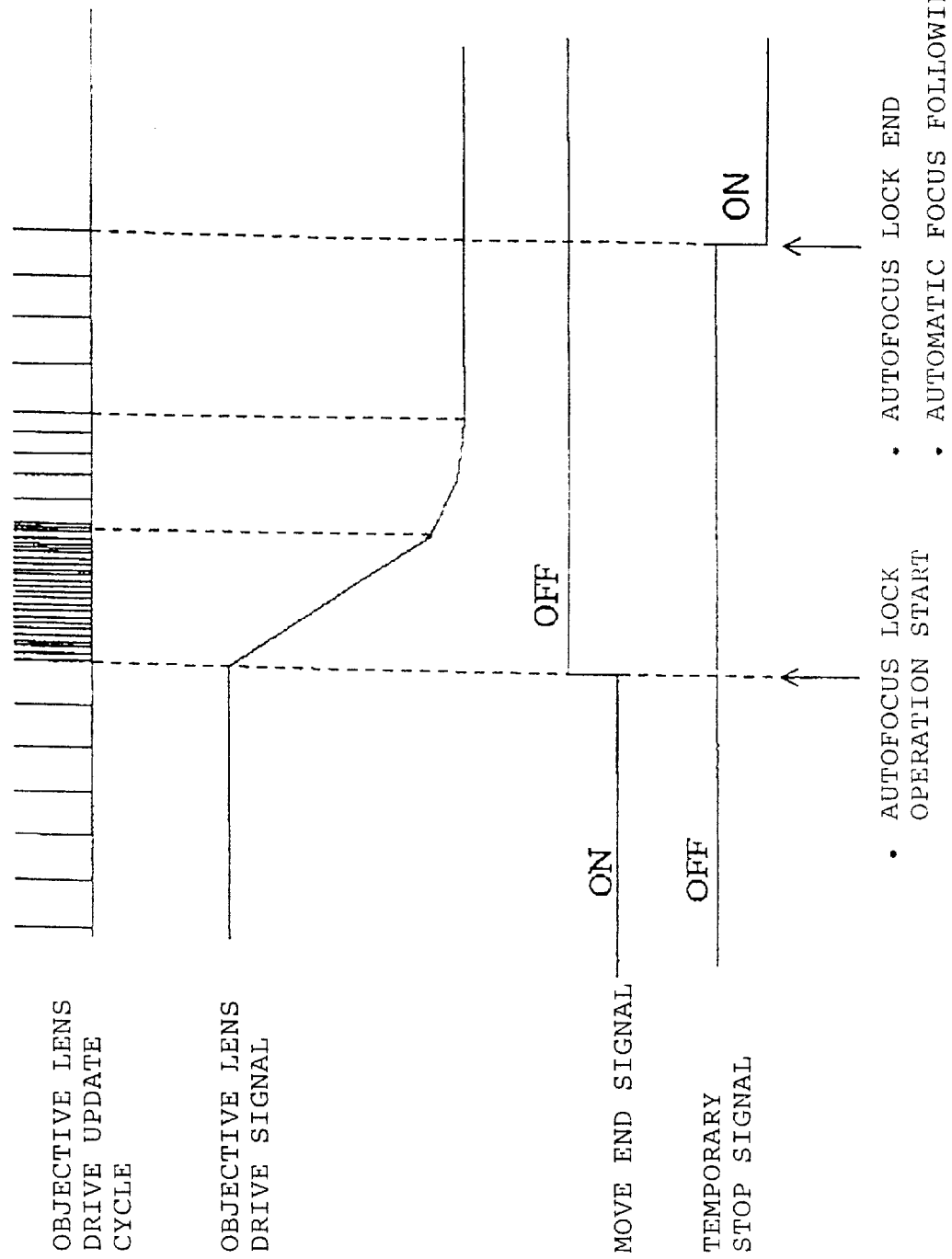

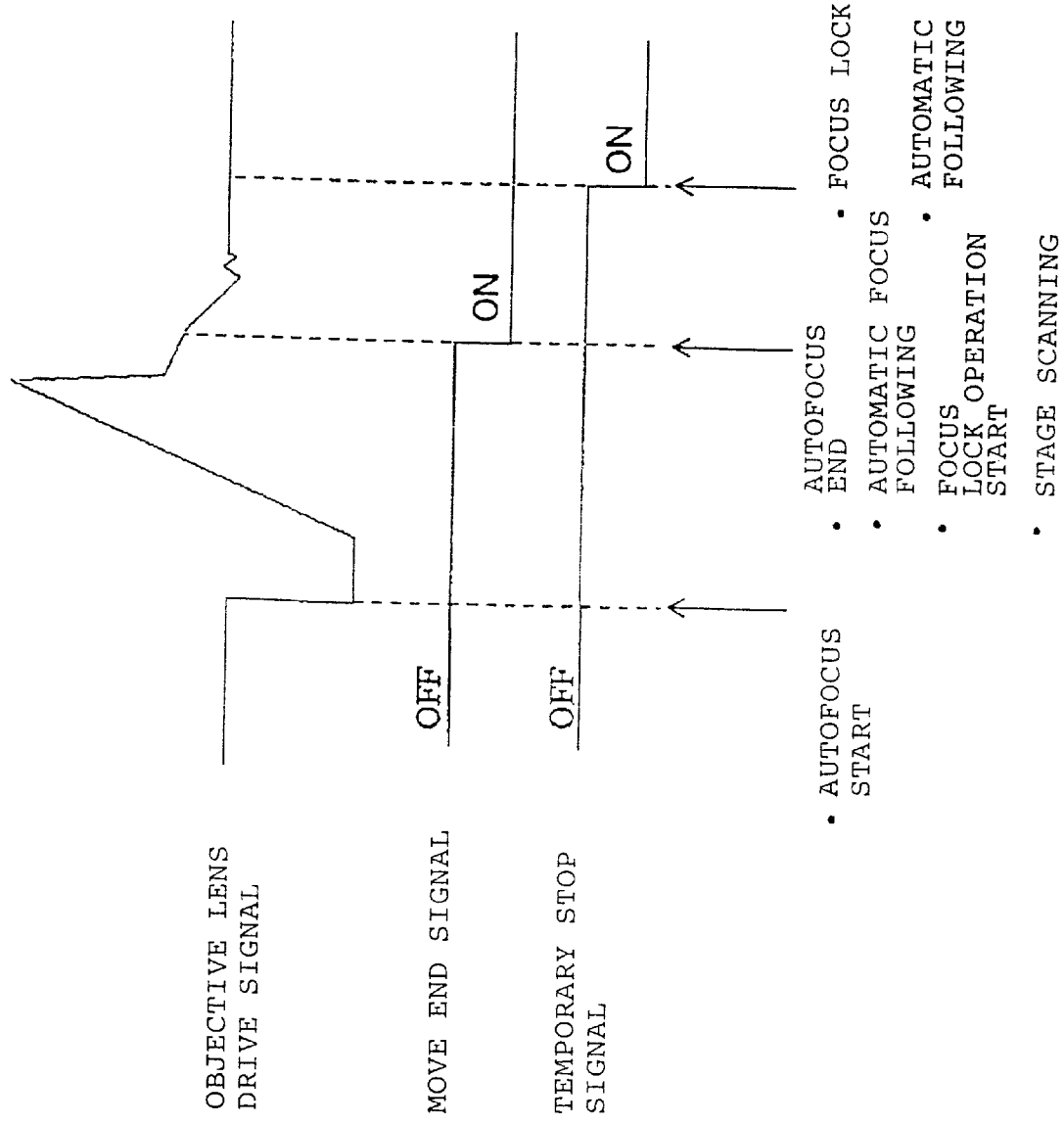

FOCUSING METHOD

BACKGROUND OF THE INVENTION

1. Field of the Invention

The present invention relates to a focusing method for accurately adjusting a focus of an objective lens to a surface of a target object, for example, in a repairing apparatus of a semiconductor mask for use in exposure steps in the semiconductor manufacturing process, an optical inspecting apparatus, or a laser processing apparatus.

2. Description of the Related Art

It is known that optical systems for focus detection employs an astigmatism method, a knife edge method, a skew method and the like. A number of approaches have been proposed for preventing malfunctions or for offset of a focus in association with such systems (see, for example, Japanese Patent Laid-open Publication No.3335/1992 and Japanese Patent Laid-open Publication No.312510/1993).

Japanese Patent Laid-open Publication No.250406/1996 discloses an autofocus device for an exposure apparatus. With the autofocus device, a focus is detected by irradiating a target object with light for focus detection without the intervention of a projection lens and then detecting reflected light from the target object by a sensor to perform signal processing. Also, such focus detection is performed at a number of positions and the detected values are averaged to perform operations for obtaining the height of a step to which a focus is to be adjusted, and an offset amount is calculated.

As shown in an embodiment of Japanese Patent Laid-open Publication No.250406/1996, the averaging is effective in detecting a focus when a wafer has a pattern with projections and depressions. However, no consideration is given to errors caused by focus detection on a surface of a target object on which reflectances vary greatly with positions, for example at an edge of a pattern formed on a glass substrate in a semiconductor mask. Namely, it provides no improvement in the accuracy of focus detection itself.

In an automatic focus detecting method conventionally proposed, in the case where a pattern is formed on a glass substrate such as in a semiconductor mask, since the reflectance on the pattern is very different from that at other positions, inconsistency may occur in the focuses detected on each position. When focus detection is performed at a portion of the pattern smaller than the diameter of a luminous flux for focus detection or at an edge of the pattern, for example, the intensity distribution of reflected light returning to a sensor may not be uniform due to the influence of diffraction or the like, which cannot be distinguished from signal changes due to misfocusing and results in malfunctions.

In addition, when foreign matter such as dust is present on a target object, malfunctions may occur since a luminous flux for focus detection returning to the sensor is deviated from a predetermined light receiving position of the sensor. Specifically, scattering or diffraction of the luminous flux for focus detection due to dust or the like causes a nonuniform intensity distribution of the reflected light returning to the sensor similarly to the aforementioned case, resulting in confusion with signal changes due to misfocusing.

Especially when such a focus detecting apparatus is used in a laser processing apparatus, the occurrence of dust from the processing increases the probability of malfunctions. Also, when the peripheries of a processed area are not processed at uniform height, focus detection at those non-uniform heights of the processed area causes a nonuniform intensity distribution of the luminous flux for focus detection returning to the sensor, leading to malfunctions.

A device capable of solving the aforementioned problems is a focus detecting apparatus in Japanese Patent Laid-open Publication No.306554/1999. The focus detecting apparatus comprises light source 10, optical device 11, objective lens 12, objective lens driving apparatus 13, stage 14, autofocus signal processing circuit 15, and stage driving control circuit 16, as shown in FIG. 1.

Luminous flux 17 for focus detection enters from light source 10 on optical device 11 to a position deviated from optical axis 28 of objective lens 12, and the luminous flux is polarized. Luminous flux 17 for focus detection is not aligned with optical axis 28 but is substantially parallel, and passes through polarization beam splitter 18. The luminous flux through polarization beam splitter 18 passes through quarter-wave plate 19 for changing linearly polarized light into circularly polarized light, and then passes through relay lens 20. Relay lens 20 consists of two groups and is formed to converge the light once. Relay lens 20 can change the diameter of luminous flux 17 as required. The luminous flux through relay lens 20 passes through dichroic mirror 27 and is converged by objective lens 12 near the surface of target object 21, and then reflected by target object 21 and again enters objective lens 12. Target object 21 is fixed on stage 14 which is movable by stage driving control circuit 16.

The returning light from objective lens 12 again passes through quarter-wave plate 19 after transmission through dichroic mirror 27 and relay lens 20. At this time, the action of quarter-wave plate 19 changes the returning light into linearly polarized light with its polarized direction 90 degrees different from the original polarized direction when it entered polarization beam splitter 18. Thus, the returning light through quarter-wave plate 19 is efficiently reflected by polarization beam splitter 18 on which it enters next. The returning light reflected by polarization beam splitter 18 is branched to two directions by next beam splitter 22. One of the branched returning lights is converged by condenser lens 23, while the other is converged by the same condenser lens 24 as condenser lens 23. The optical axes of condenser lenses 23 and 24 are arranged on optical axis 28. The returning light through condenser lens 23 enters two-division sensor 25 disposed in front of a position A where condenser lens 23 converges the returning light when the focus of objective lens 12 is adjusted to the surface of target object 21. On the other hand, the returning light through condenser lens 24 enters two-division sensor 26 disposed behind a position B where condenser lens 24 converges the returning light when the focus of objective lens 12 is adjusted to the surface of target object 21. Signals obtained by respective sensors 25 and 26 are subjected to operational processing at autofocus signal processing circuit 15. Two-division sensors 25 and 26 are disposed with the same optical inclination.

When this focus detecting apparatus is applied to an optical inspecting apparatus, a laser processing apparatus or the like, a luminous flux for inspecting or processing may enter objective lens 12 through dichroic mirror 27.

Autofocus signal processing circuit 15 for performing the aforementioned operational processing detects values of a focus signal while it drives objective lens 12 with respect to target object 21 at rest, and stops objective lens 12 at the position where the value of the focus signal is equal to zero, and this position is set to a focus position. When stage 14 is moved by stage driving control circuit 16, driving apparatus 13 for objective lens 12 is controlled such that a value F of the focus signal is always zero during the stage movement.

The value of the focus signal is obtained on the basis of the values of output signals from two-division sensors 25 and 26 as follows.

FIG. 2 shows autofocus signal processing circuit 15 for performing the operational processing of the output signals from two-division sensors 25 and 26.

In FIG. 2, assuming that the values of output signals from light receiving sections A1 and A2 constituting two-division sensor 25 are a1 and a2, respectively, and the values of output signals from light receiving sections B1 and B2 constituting two-division sensor 26 are b1 and b2, respectively, then the value F of the focus signal is calculated with F=Fa−Fb=(a1−a2)(b2−b1), and the result outputs as a processed signal of autofocus signal processing circuit 15.

Returning lights 41 of the luminous flux for focus detection on respective two-division sensors 25 and 26 move in accordance with the change of the focus position of objective lens 12 to target object 21. Returning lights 41 in FIG. 2 show returning lights when the focus of objective lens 12 is adjusted to the surface of target object 21. When target object 21 is moved in the optical axis direction with respect to objective lens 12 in the configuration in FIG. 1, for example, returning lights 41 move in the direction of arrow 42 on the surfaces of the respective sensors as shown in FIG. 2. The moving direction intersects the two-division line of each of two-division sensors 25 and 26 which are disposed optically equivalently.

FIG. 3A to FIG. 3C show output signals obtained when the position of target object 21 is moved in the optical axis direction. In FIG. 3A and FIG. 3B, curves with numerals 51, 52, 54, and 55 represent the aforementioned values a1, a2, b1, and b2 of the output signals. The curves with numerals 53 and 56 represent values Fa and Fb of differential signals in the light receiving sections of two-division sensors 25 and 26. Curve 61 in FIG. 3C represents the value F=Fa−Fb of a focus signal to be obtained. The focus of objective lens 12 is adjusted to the surface of the target object 21 when the value F is equal to zero. The horizontal axes in graphs in FIG. 3A to FIG. 3C represent the positions of the objective lens. Specifically, assuming that the position of the objective lens is reference zero when the focus of objective lens 12 is adjusted to the surface of target object 21, objective lens 12 is at a position away from target object 21 as the value on the horizontal axes moves in (−) direction, while objective lens 12 is at a position near target object 21 as the value moves in (+) direction.

According to the aforementioned configuration, a favorable focus signal can always be obtained to accurately perform focus detection even when reflectances vary with positions on a target object due to a pattern on or a shape of the target object, or foreign matter on the target object.

However, the accuracy of focus detection is reduced if an optical axis is poorly adjusted or aberration is present in optical systems, which is true for most focus detection apparatuses using optical systems. In focus detection apparatus disclosed in Japanese Patent Laid-open Publication No.306554/1999, the shape of gathered light beam is rotated 180 degrees in front of and behind the position where the returning light of the luminous flux for focus detection is converged at the condenser lens when the focus of the objective lens is adjusted to the surface of a target object. However, the same results are not obtained if aberration is present in optical systems. Thus, the accuracy of focus detection is reduced.

SUMMARY OF THE INVENTION

It is an object of the present invention to provide a focusing method in a focus detecting apparatus capable of reducing errors in focusing due to states at a position on a target object where a focus is detected, or due to aberration in optical systems, maladjustment of an optical axis or the like.

The present invention provides a focusing method for use in a focus detecting apparatus comprising an objective lens, means for entering a luminous flux for focus detection into a target object from a position inconsistent with an optical axis of the objective lens through at least the objective lens, a condenser lens for converging the luminous flux after it is reflected by the target object and again passes through the objective lens, two two-division sensors disposed with the same optical inclination in front of and behind a position where the reflected luminous flux is converged by the condenser lens when a focus of the objective lens is adjusted to the surface of the target object, and a signal processing circuit for performing operational processing of signals from the two two-division sensors. The focusing method includes an autofocus step of driving the objective lens with respect to the target object in rest and stopping the objective lens at a position where a processed signal of the signal processing circuit presents a value indicating a focus position; and a focus lock step of repeating a series of operations over a plurality of times while the target object is moved, the series of operations including a detection of processed signals of the signal processing circuit over a number of times, averaging of the detected signals, and drive of the objective lens such that the resultant average value matches a processed signal of the signal processing circuit to update the focus position, and then fixing the focus position.

It is preferable that the number of the detected signals in the averaging immediately before the end of the averaging is higher than that immediately after the start of the averaging and that an update cycle for the focus position immediately before the end of the averaging is longer than that immediately after the start of the averaging for reducing time of focus detection and for improving the accuracy of focus detection.

The focus lock step may be performed in response to a predetermined instruction or may be automatically started after the end of the autofocus step.

A focus detecting apparatus for performing the aforementioned focusing method preferably comprises an objective lens, means for entering a luminous flux for focus detection into a target object from a position inconsistent with an optical axis of the objective lens through at least the objective lens, a beam splitter for branching the luminous flux to two directions after it is reflected by the target object and again passes through the objective lens, a first condenser lens for converging one of the luminous flux branched by the beam splitter, a second condenser lens for converging the other luminous flux branched by the beam splitter, a first two-division sensor disposed in front of a position where the one luminous flux branched by the beam splitter is converged by the first condenser lens when a focus position of the objective lens is adjusted to the surface of the target object, a second two-division sensor disposed with the same optical inclination as that of the first two-division sensor behind a position where the other luminous flux branched by the beam splitter is converged by the second condenser lens when the focus position of the objective lens is adjusted to the surface of the target object, and a signal processing circuit for performing operational processing of signals from the two-division sensors.

In the apparatus, the signal processing circuit preferably outputs a signal represented by $F=(a1-a2)-(b2-b1)$, wherein values of output signals from two light receiving sections constituting the first two-division sensor are a1 and a2, respectively, a value of an output signal from a light receiving section of two light receiving sections constituting the second two-division sensor at a position optically equivalent to the light receiving section for outputting the output signal a1 is b1, and a value of an output signal from a light receiving section at a position optically equivalent to the light receiving section for outputting the output signal a2 is b2.

As described above, according to the focusing method of the present invention, for example in the focus detecting apparatus in Japanese Patent Laid-open Publication No.306554/1999 which can accurately detect a focus for a surface of a target object on which reflectances vary greatly with positions, the detection of a focus signal is performed many times, the detected signal values are averaged, the resultant average value is used to drive the objective lens, and the focus position is updated, after the focusing operations. This series of operations is repeated over a plurality of numbers while the subject is moved. In the averaging step, the number of detecting times of a focus signal immediately before the end of the averaging is higher than that immediately after the start of the averaging. Namely, coarse check is first performed for a focus position to be derived, and gradually, finer check is performed.

Since the focus position is set with the averaging of the detected focus at a number of positions in this manner, it is possible to reduce errors in focusing due to a pattern, dust on a target object, aberration of optical systems or the like, thereby allowing improvement in accuracy of focus detection.

The above and other objects, features and advantages of the present invention will become apparent from the following description with reference to the accompanying drawings which illustrate examples of the present invention.

BRIEF DESCRIPTION OF THE DRAWINGS

FIG. 2 is a diagram showing a configuration of an autofocus signal processing circuit for performing operational processing of output signals from two-division sensors shown in FIG. 1;

FIG. 5 is a diagram showing an example of an update cycle for an object lens position in case of performing an action from the start of a focus lock operation to the end of the focus lock operation in FIG. 4; and FIG. 6 is a timing chart for a focus detecting operation according to another embodiment of the present invention.

DETAILED DESCRIPTION OF THE PREFERRED EMBODIMENTS OF THE INVENTION

Figure 1:
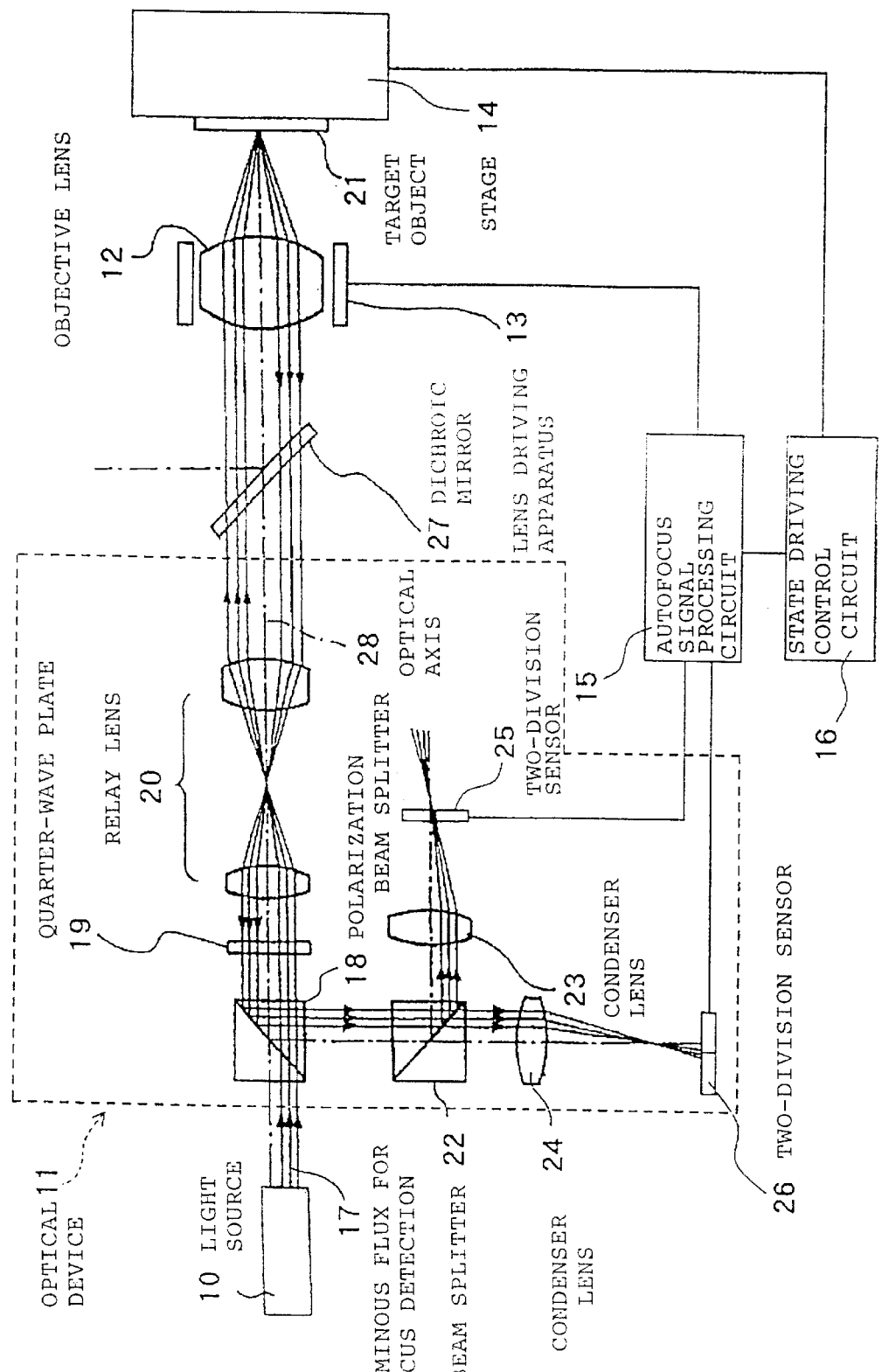
FIG. 1 is a diagram showing a prior art focus detecting apparatus disclosed in Japanese Patent Laid-open Publication No.306554/1999.
Figure 3A:
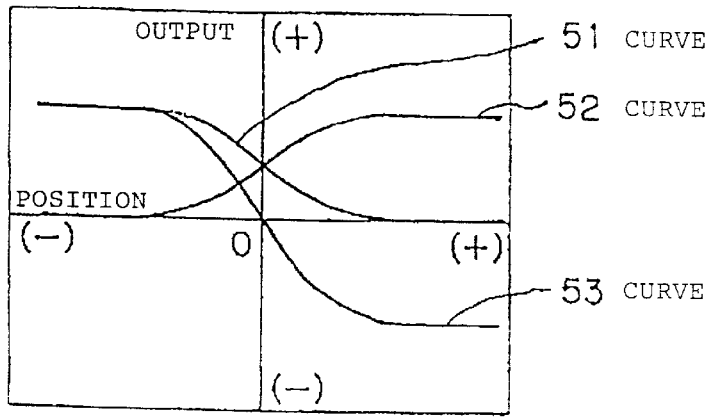
FIG. 3A to FIG. 3C are graphs representing focus signals from the two-division sensors shown in FIG. 2.
Figure 3B:
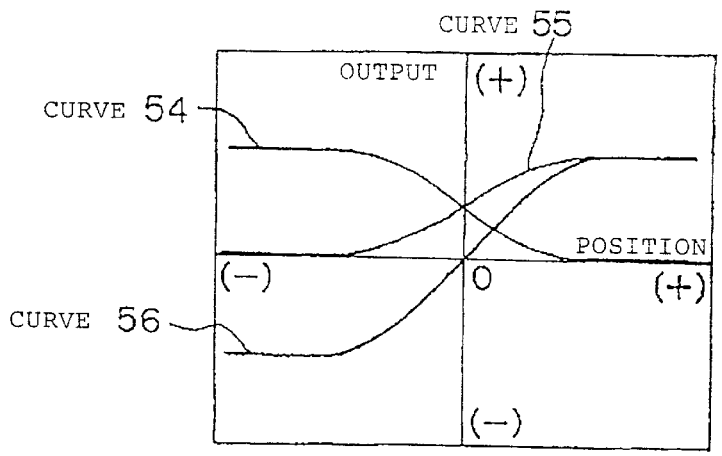
Figure 3C:
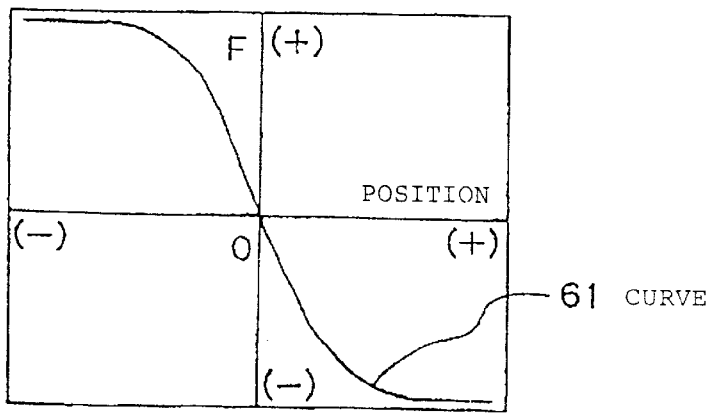

In the focus detecting apparatus of Japanese Patent Laid-open Publication No.306554/1999 shown in FIG. 1, auto-focus signal processing circuit 15 detects, in response to an instruction for starting focus detection, the focus signal F shown in FIG. 3C while it drives objective lens 12 with respect to target object 21 in rest, and stops objective lens 12 at the position where the value of the focus signal F is equal to zero, and this position is set to a focus position. However, as described already, when optical adjustment is inadequate or aberration is present in optical systems of the apparatus in FIG. 1, the focus of that stopped objective lens 12 may be deviated from the optimal focus position. To reduce such errors in focusing, a method as described below is used as an embodiment of the present invention after the focus position is detected with the aforementioned focusing operations (i.e. after the autofocus operations).

Figure 4:
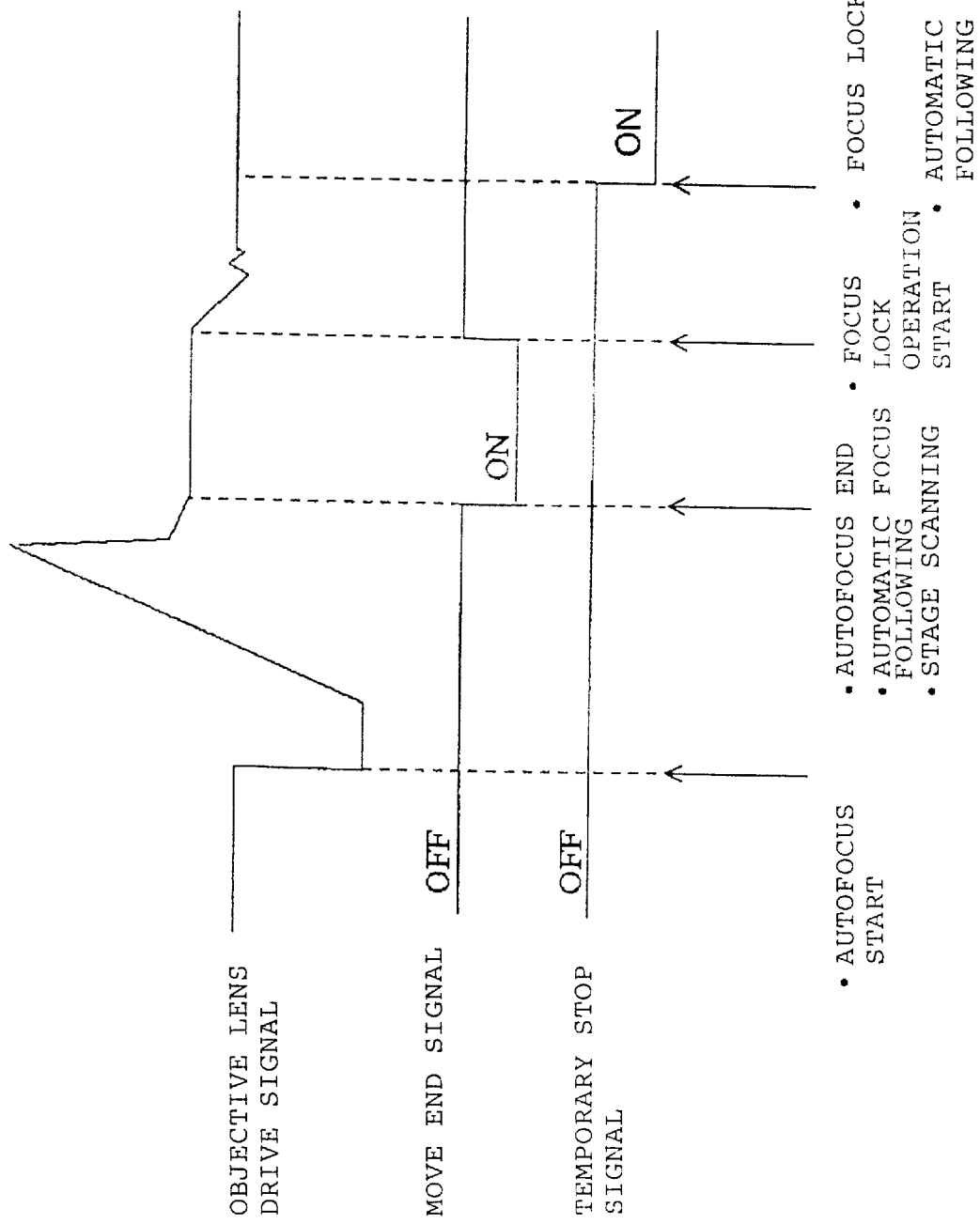
FIG. 4 is a diagram showing timings for activating the focus detecting apparatus in FIG. 1 which is an embodiment of the present invention.

After the completion of the autofocus operations, autofocus signal processing circuit 15 in the apparatus in FIG. 1 shifts to an operation (hereinafter referred to as "automatic focus following") for causing the focus of objective lens 12 to follow a focus position obtained from an averaging, later described, as shown in FIG. 4. During the automatic focus following, stage driving control circuit 16 moves stage 14 on which target object 21 is disposed along a predetermined track in a plane. The moving track may be an arbitrary shape such as a straight line or a circle.

Upon shift to the automatic focus following, MOVE END signal is switched from OFF to ON, and an averaging process is started on the basis of this signal change. In the averaging process, the focus signal F is detected at a predetermined number of samplings from point to the other point on target object 21 to be moved, the detected signals are averaged, and the position of objective lens 12 is updated by controlling lens driving apparatus 13 such that the average value matches the value F of the focus signal which is a processed signal of autofocus signal processing circuit 15. Such update of the objective lens position is repeated over a plurality of times in predetermined cycles during the move of target object 21.

Thereafter, a focus lock operation, later described, is performed for a certain time period in response to an instruction for starting the focus lock operation from an external apparatus. Next, the automatic focus following is ended by a temporary stop signal from autofocus signal processing circuit 15 switched to ON, and the focus position (the position of objective lens 12) is fixed.

The situations during such operations are described in more detail with reference to FIG. 5 which explains the operation from the start of the focus lock operation in FIG. 4 to the end thereof. Referring to FIG. 5, it is clear that the objective lens is driven with an update cycle for the objective lens position divided into three in order to reduce the setting time of the focus position and to improve the accuracy of focus detection.

Specifically, as shown in FIG. 5, the instruction for starting the focus lock operation switches MOVE END signal from ON to OFF. This signal change modifies the number of samplings and the update cycle for the objective lens position in the aforementioned averaging. In the modification, the update cycle for the objective lens position becomes shorter than that before the start of the focus lock operation, and the number of samplings for one update is reduced. After the lapse of a certain time period, the update cycle for the objective lens position is lengthened and the number of samplings is increased. Then, the update cycle and the number of samplings are returned to those before the start of the focus lock operation, and the update is stopped at some point in time (timing at which the temporary stop signal is switched to ON) to fix the focus position. The target object is preferably processed or inspected, for example, in this state.

Next, description is made for another embodiment.

The timing chart in FIG. 4 shows a method for performing the focus lock operation only after the instruction for starting the focus lock operation when misfocusing occurs during the automatic focus following. The focus lock operation, however, may be performed immediately after the autofocus operations. Specifically, after the focus position is detected with the autofocus operations, automatic transition to the focus lock operation may be performed. FIG. 6 shows such an embodiment different from the aforementioned embodiment.

More particularly, the apparatus in FIG. 1 is used, and after the autofocus operations, automatic transition to the focus lock operation is performed as shown in FIG. 6. With this transition, MOVE END signal is switched from OFF to ON, target object 21 is moved with stage 14, and the automatic focus following involving the averaging process is started. In the averaging process, averaging of focus signals F obtained from samplings over a number of times, and control of objective lens driving apparatus 13 based on the resultant average value to update the position of objective lens 12 are repeated over a plurality of times. In the averaging process, similarly to the aforementioned embodiment described with reference to FIG. 5, the number of detecting times of a focus signal immediately before the end of the averaging process is higher than that immediately after the start of the averaging process, and an update cycle for the objective lens position immediately before the end of the averaging process is longer than that immediately after the start of the averaging process. It is thus possible to shorten the setting time of the focus position and to improve the accuracy of the focus detection.

After such a focus lock operation is performed for a certain time period, the automatic focus following is stopped in response to a temporary stop signal from autofocus signal processing circuit 15 switched to ON, and the focus position (the position of the objective lens 12) is fixed.

According to the embodiments described above, a focusing method is used in which, after a focusing operation, focus detection is performed many times, the detected values are averaged and the resultant average value is used to drive the object lens, and such a series of operations is repeated over a number of times while the target object is moved, and then the focus position is fixed. With this method, the focus position can be accurately detected since errors in focusing due to a pattern, dust on the target object, the presence of projections or the like are averaged. Particularly, when the method of the present invention is applied to the focus detecting apparatus in Japanese Patent Laid-open Publication No.306554/1999, the accuracy of focus detection is improved in a target object on which reflectances vary greatly with positions due to a pattern formed thereon, the presence of chips, projections, foreign matters or the like even when aberration is present in optical systems. Focusing is possible with the accuracy of ±0.2 μm or less, for example.

While preferred embodiments of the present invention have been described using specific terms, such description is for illustrative purposes only, and it is to be understood that changes and variations may be made without departing from the spirit or scope of the following claims.

What is claimed is:

1. A method of focusing for use in a focus detecting apparatus comprising an objective lens, means for entering a luminous flux for focus detection into a target object from a position inconsistent with an optical axis of said objective lens through at least said objective lens, a condenser lens for converging the luminous flux after it is reflected by said target object and again passes through said objective lens, two two-division sensors disposed with the same optical inclination in front of and behind a position where said reflected luminous flux is converged by said condenser lens when a focus of said objective lens is adjusted to the surface of said target object, and a signal processing circuit for performing operational processing of signals from said two two-division sensors, the method comprising the steps of:

an autofocus step of driving said objective lens with respect to said target object in rest and stopping said objective lens at a position where a processed signal corresponding to the luminous flux reflected by said target object after repassing through said objective lens of said signal processing circuit presents a value indicating a focus position; and a focus lock step of repeating a series of operations while said target object is moved, the series of operations including detection of processed signals of said signal processing circuit over a number of times, averaging of the detected signals, and drive of said objective lens such that the resultant average value matches a processed signal of said signal processing circuit to update the focus position, and then fixing the focus position.

2. The method of focusing according to claim 1, wherein the number of detecting times of a signal in said averaging immediately before the end of said averaging is higher than that immediately after the start of said averaging.

3. The method of focusing according to claim 2, wherein an update cycle for said focus position immediately before the end of said averaging is longer than that immediately after the start of said averaging.

4. The method of focusing according to claim 3, wherein said focus lock step is performed in response to a predetermined instruction after the end of said auto focus step.

5. The method of focusing according to claim 3, wherein said focus lock step is automatically started after the end of said autofocus step.

6. A method of focusing for use in a focus detecting apparatus comprising an objective lens, means for entering a luminous flux for focus detection into a target object from a position inconsistent with an optical axis of said objective lens through at least said objective lens, a beam splitter for branching the luminous flux to two directions after it is reflected by said target object and again passes through said objective lens, a first condenser lens for converging one of the luminous flux branched by said beam splitter, a second condenser lens for converging the other luminous flux branched by said beam splitter, a first two-division sensor disposed in front of a position where the one luminous flux branched by said beam splitter is converged by said first condenser lens when a focus position of said objective lens is adjusted to the surface of said target object, a second two-division sensor disposed with the same optical inclination as that of said first two-division sensor behind a position where the other luminous flux branched by said beam splitter is converged by said second condenser lens when the focus position of said objective lens is adjusted to the surface of said target object, and a signal processing circuit for performing operational processing of signals from said two-division sensors, the method comprising the steps of:

an autofocus step of driving said objective lens with respect to said target object in rest and stopping said object lens at a position where a processed signal of said signal processing circuit presents a value indicating a focus position; and a focus lock step of repeating a series of operations over a plurality of times while said target object is moved, the series of operations including detection of processed signals of said signal processing circuit over a number of times, averaging of the detected signals, and drive of said objective lens such that the resultant average value matches a processed signal of said signal processing circuit to update the focus position, and then fixing the focus position.

7. The method of focusing according to claim 6, wherein said signal processing circuit outputs a signal represented by $F=(a1-a2)-(b2-b1)$, wherein values of output signals from two light receiving sections constituting said first two-division sensor are a1 and a2, respectively, a value of an output signal from a light receiving section of two light receiving sections constituting said second two-division sensor at a position optically equivalent to the light receiving section for outputting said output signal a1 is b1, and a value of an output signal from a light receiving section at a position optically equivalent to the light receiving section for outputting said output signal a2 is b2.

8. The method of focusing according to claim 7, wherein the number of detecting times of a signal in said averaging immediately before the end of said averaging is higher than that immediately after the start of said averaging.

9. The method of focusing according to claim 8, wherein an update cycle for said focus position immediately before the end of said averaging is longer than that immediately after the start of said averaging.

10. The method of focusing according to claim 9, wherein said focus lock step is performed in response to a predetermined instruction after the end of said autofocus step.

11. The method of focusing according to claim 9, wherein said focus lock step is automatically started after the end of said autofocus step.

* * * * *